(12) United States Patent
Tan et al.

(10) Patent No.: US 11,887,473 B2
(45) Date of Patent: Jan. 30, 2024

(54) ROAD CONGESTION DETECTION METHOD AND DEVICE, AND ELECTRONIC DEVICE

(71) Applicant: Beijing Baidu Netcom Science Technology Co., Ltd., Beijing (CN)

(72) Inventors: Xiongfei Tan, Beijing (CN); Yiming Zhang, Beijing (CN); Tingting Ge, Beijing (CN); Xun Gan, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 6 days.

(21) Appl. No.: 17/698,347

(22) Filed: Mar. 18, 2022

(65) Prior Publication Data

US 2022/0215747 A1    Jul. 7, 2022

(30) Foreign Application Priority Data

Sep. 22, 2021 (CN) .......................... 202111106124.4

(51) Int. Cl.
*G08G 1/01* (2006.01)
*G06V 20/54* (2022.01)
*G08G 1/04* (2006.01)

(52) U.S. Cl.
CPC ........... *G08G 1/0141* (2013.01); *G06V 20/54* (2022.01); *G08G 1/04* (2013.01)

(58) Field of Classification Search
CPC ......... G08G 1/0141; G08G 1/04; G06V 20/54
See application file for complete search history.

(56) References Cited

U.S. PATENT DOCUMENTS

| | | | | |
|---|---|---|---|---|
| 6,188,778 B1 * | 2/2001 | Higashikubo | ............ | G08G 1/04 382/104 |
| 2018/0086347 A1 * | 3/2018 | Shaikh | ............... | G01C 21/3453 |

FOREIGN PATENT DOCUMENTS

| | | | | |
|---|---|---|---|---|
| CN | 102136194 A | 7/2011 | | |
| CN | 107545758 A | 1/2018 | | |
| CN | 108550259 * | 4/2018 | ............ | G06F 18/24 |
| CN | 108550259 A | 9/2018 | | |
| CN | 108710875 B | 1/2019 | | |
| CN | 112289041 A | 1/2021 | | |
| CN | 113192336 * | 5/2021 | ............ | G08G 1/065 |
| CN | 113192336 A | 7/2021 | | |
| WO | 2019042728 A2 | 3/2019 | | |

OTHER PUBLICATIONS

Chinese Office Action for Chinese application No. CN 202111106124. 4, dated May 26, 2022.

* cited by examiner

*Primary Examiner* — Hongmin Fan
(74) *Attorney, Agent, or Firm* — Quinn IP Law

(57) ABSTRACT

A road congestion detection method realized by a computer includes obtaining K images taken by L cameras corresponding to a first road at a same target time point, the first road including M road sections, each road section corresponding to at least one camera, M, L, K each being a positive integer, L being greater than or equal to M, performing target detection on each image to obtain area ratio information, the area ratio information representing a ratio of an area of vehicles on a lane of a target road section to an area of the lane of the target road section, the target road section being a road section corresponding to the image in the M road sections, and determining a first congestion detection result of the first road at the target time point in accordance with K pieces of area ratio information corresponding to the M road sections.

17 Claims, 6 Drawing Sheets

ROAD CONGESTION DETECTION METHOD AND DEVICE, AND ELECTRONIC DEVICE

CROSS-REFERENCE TO RELATED APPLICATION

This application claims a priority to Chinese Patent Application No. 202111106124.4 filed on Sep. 22, 2021, the disclosure of which is incorporated in its entirety by reference herein.

TECHNICAL FIELD

The present disclosure relates to the field of image processing technology, in particular to the field of intelligent traffic technology, more particularly to a road congestion detection method, a road congestion detection device, and an electronic device.

BACKGROUND

Along with the rapid development of society and economy, the quantity of vehicles increase dramatically, and such a traffic problem as road congestion occurs frequently. It is necessary to perform road congestion detection so as to solve the above problem.

Generally, a scheme for road congestion detection includes counting the quantity of vehicles on the basis of image recognition, i.e., monitoring the quantity of vehicles running on a road within a certain time period, so as to determine whether the road is in a congested state.

SUMMARY

In a first aspect, the present disclosure provides in some embodiments a road congestion detection method realized by a computer, including: obtaining K images taken by L cameras corresponding to a first road at a same target time point, the first road comprising M road sections, each road section corresponding to at least one camera, M, L and K each being a positive integer, and L being greater than or equal to M; performing target detection on each image to obtain area ratio information, the area ratio information representing a ratio of an area of vehicles on a lane of a target road section to an area of the lane of the target road section, the target road section being a road section corresponding to the image in the M road sections; and determining a first congestion detection result of the first road at the target time point in accordance with K pieces of area ratio information corresponding to the M road sections.

In some embodiments of the present disclosure, the first congestion detection result represents whether the first road is in a congested state, and the determining the first congestion detection result of the first road at the target time point in accordance with the K pieces of area ratio information corresponding to the M road sections comprises, in the case that the K pieces of area ratio information meet a predetermined condition, determining that the first road is in the congested state at the target time point, the predetermined condition comprises that there are N pieces of target area ratio information in the K pieces of area ratio information, the N pieces of target area ratio information being area ratio information corresponding to N consecutive road sections in the first road, the target area ratio information is area ratio information where the ratio is greater than a first predetermined threshold, where N is a positive integer smaller than or equal to M, and a ratio of N to M is greater than or equal to a second predetermined threshold.

In some embodiments of the present disclosure, in the case that the first road has at least two directions, the N pieces of target area ratio information is area ratio information corresponding to N consecutive road sections in the first road in a same direction.

In some embodiments of the present disclosure, the method further includes obtaining a congestion detection result of the first road at a predetermined time interval; and in the case that an input for adjusting target information in accordance with at least two congestion detection results of the first road has been received, adjusting the target information in accordance with an input parameter of the input. And the target information comprises at least one of the predetermined time interval, the first predetermined threshold or the second predetermined threshold.

In some embodiments of the present disclosure, the performing the target detection on the image to obtain the area ratio information includes: performing the target detection on the image to obtain vehicle detection information, the vehicle detection information comprising a vehicle detection box for each vehicle image content in the case that the image comprises the vehicle image content; determining an area of each vehicle on the lane of the target road section, the area being an area of the lane covered by the vehicle detection box in the image; and determining a ratio of the area of the lane covered by the vehicle detection boxes in the image to the area of the lane of the target road, so as to obtain the area ratio information.

In some embodiments of the present disclosure, the first road is a road in a target space object, and the target space object further comprises a second road, wherein the road congestion detection method further includes: obtaining a second congestion detection result of the second road at the target time point; and controlling the vehicles in the target space object in accordance with the first congestion detection result and the second congestion detection result.

In some embodiments of the present disclosure, the controlling the vehicles comprises at least one of navigation route planning, parking space recommendation, or vehicle guiding and diversion.

In a second aspect, the present disclosure provides in some embodiments an electronic device realized by a computer, including at least one processor and a memory in communication with the at least one processor, wherein the memory is configured to store therein an instruction executed by the at least one processor, and the at least one processor is configured to enable the electronic device to execute the instruction so as to implement a road congestion detection method, including: obtaining K images taken by L cameras corresponding to a first road at a same target time point, the first road comprising M road sections, each road section corresponding to at least one camera, M, L and K each being a positive integer, and L being greater than or equal to M; performing target detection on each image to obtain area ratio information, the area ratio information representing a ratio of an area of vehicles on a lane of a target road section to an area of the lane of the target road section, the target road section being a road section corresponding to the image in the M road sections; and determining a first congestion detection result of the first road at the target time point in accordance with K pieces of area ratio information corresponding to the M road sections.

In a third aspect, the present disclosure provides in some embodiments a non-transitory computer-readable storage medium storing therein a computer instruction, the computer instruction is executed by a computer so as to implement a road congestion detection method, including: obtaining K images taken by L cameras corresponding to a first road at a same target time point, the first road comprising M road sections, each road section corresponding to at least one camera, M, L and K each being a positive integer, and L being greater than or equal to M; performing target detection on each image to obtain area ratio information, the area ratio information representing a ratio of an area of vehicles on a lane of a target road section to an area of the lane of the target road section, the target road section being a road section corresponding to the image in the M road sections; and determining a first congestion detection result of the first road at the target time point in accordance with K pieces of area ratio information corresponding to the M road sections.

In a fourth aspect, the present disclosure provides in some embodiments a computer program product including a computer program. The computer program is executed by a processor so as to implement the above-mentioned road congestion detection method.

It should be understood that, this summary is not intended to identify key features or essential features of the embodiments of the present disclosure, nor is it intended to be used to limit the scope of the present disclosure. Other features of the present disclosure will become more comprehensible with reference to the following description.

BRIEF DESCRIPTION OF THE DRAWINGS

The following drawings are provided to facilitate the understanding of the present disclosure, but shall not be construed as limiting the present disclosure. In these drawings.

DETAILED DESCRIPTION

In the following description, numerous details of the embodiments of the present disclosure, which should be deemed merely as exemplary, are set forth with reference to accompanying drawings to provide a thorough understanding of the embodiments of the present disclosure. Therefore, those skilled in the art will appreciate that modifications or replacements may be made in the described embodiments without departing from the scope and spirit of the present disclosure. Further, for clarity and conciseness, descriptions of known functions and structures are omitted.

First Embodiment

Figure 1:
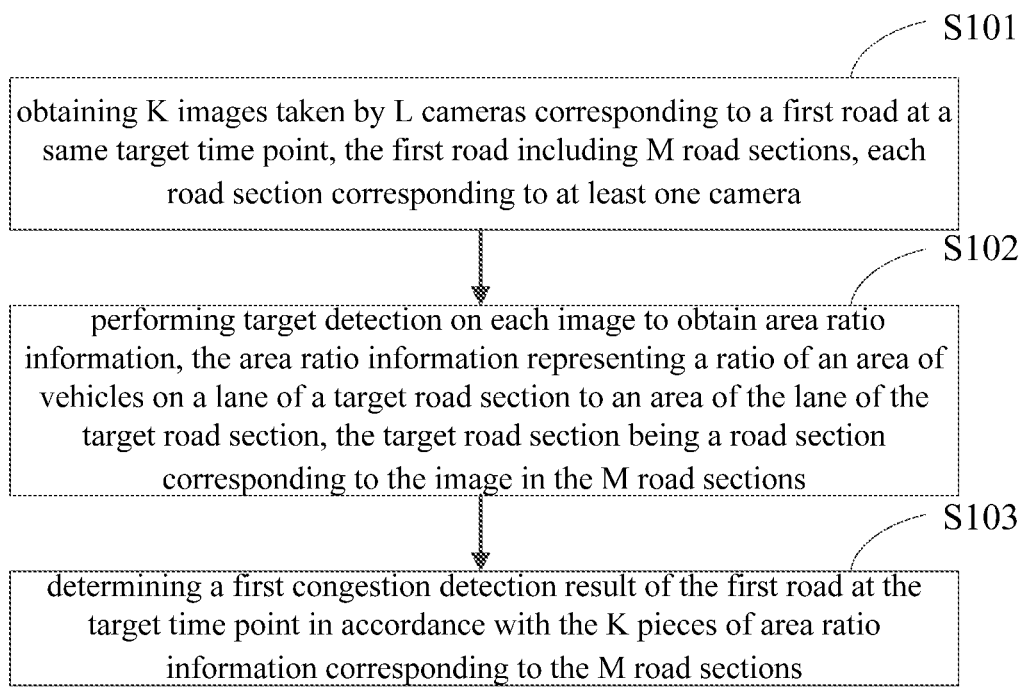
FIG. 1 is a flow chart of a road congestion detection method according to a first embodiment of the present disclosure.

As shown in FIG. 1, the present disclosure provides in this embodiment a road congestion detection method, which includes the following steps.

S101: obtaining K images taken by L cameras corresponding to a first road at a same target time point, the first road including M road sections, each road section corresponding to at least one camera.

M, L and K are positive integers, and L is greater than or equal to M.

In the embodiments of the present disclosure, the road congestion detection method relates to the field of image processing technology, in particular to the field of intelligent traffic technology, and it may be widely applied to such scenarios as navigation route planning, parking space recommendation, and vehicle guiding and diversion. The road congestion detection method may be implemented by a road congestion detection device in the embodiments of the present disclosure. The road congestion detection device may be provided in any forms of electronic device, so as to implement the road congestion detection method. The electronic device may be a server or a terminal, which will not be particularly defined herein.

The first road may be any road on which a vehicle runs. For example, the first road may be an urban road, a countryside road, or a road in a target space object. The target space object may be a parking lot, a garden or a community. In addition, the first road may also be a road in the air or a tunnel. A position of the first road will not be particularly defined herein.

The first road may be a straight, winding, circular or curved road. A shape of the first road will not be particularly defined herein.

The first road may have a length of 100 meters, or one or more kilometers. The length of the first road will not be particularly defined herein.

The first road may have a single lane, or two or more lanes in a single direction or opposite directions, which will not be particularly defined herein.

At least one camera may be provided on a side of the first road. Each camera may cover most or all of at least one lane of a certain road section of the first road, so as to capture vehicles on the at least one lane, thereby to evaluate a congestion condition of the vehicles on the at least one lane comprehensively.

Figure 2:
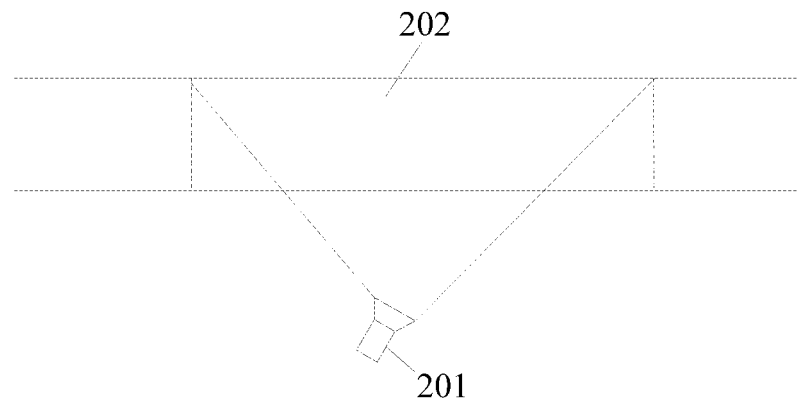
FIG. 2 is a schematic view showing a relationship between a camera and a lane of a road section according to one embodiment of the present disclosure.

As shown in FIG. 2, the first road has a single lane, and a camera 201 may cover all scope of the lane of a road section 202 of the first road.

Figure 3:
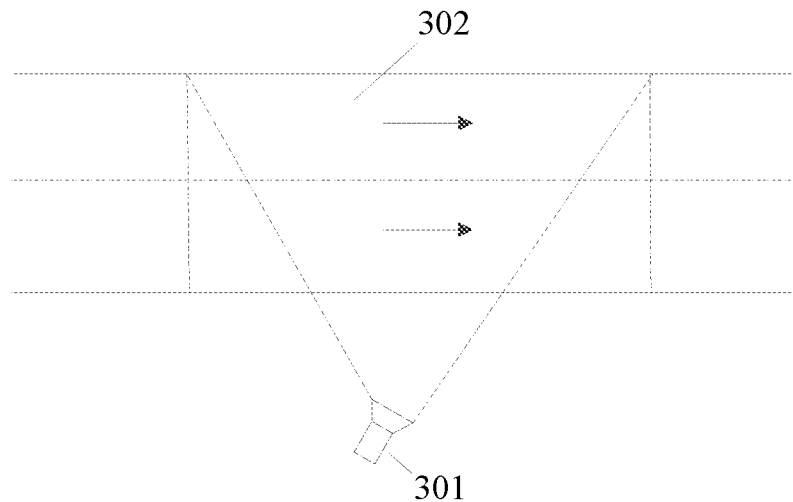
FIG. 3 is another schematic view showing the relationship between the camera and the lane of the road section according to one embodiment of the present disclosure.

As shown in FIG. 3, the first road is a single-way road including two lanes, and a camera 301 may cover all scope of the two lanes of a road section 302 of the first road.

The first road may also be double-way road. The cameras may be provided at two sides of the road section of the first road, so as to detect the congestion condition in two directions of the first road more accurately. In this case, with respect to each road section of the first road, the camera at each side may cover most or all scope of the lane of the road section in one direction.

Figure 4:
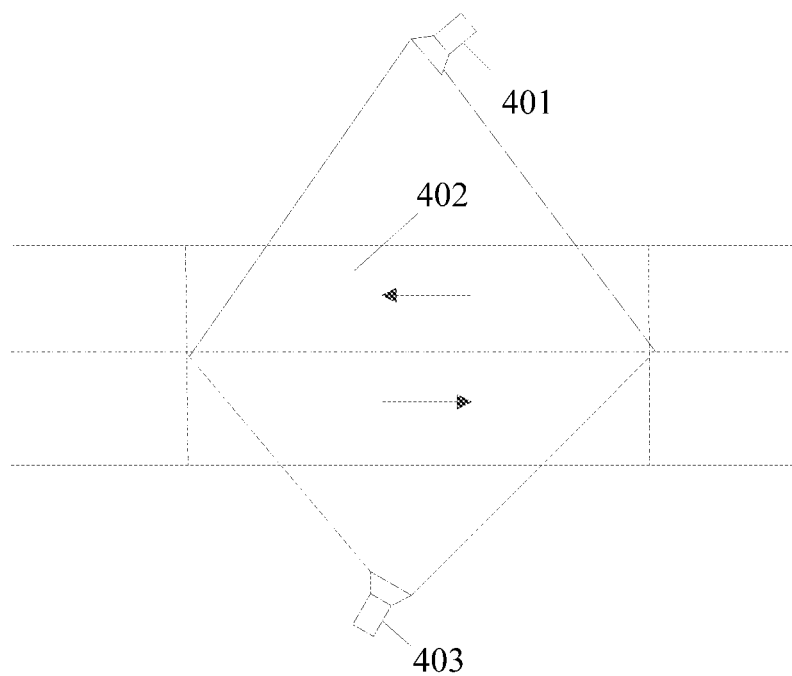
FIG. 4 is yet another schematic view showing the relationship between the camera and the lane of the road section according to one embodiment of the present disclosure.

As shown in FIG. 4, a camera 401 may cover all scope of a lane of a road section 402 of the first road in which the vehicle runs to the left, and a camera 403 may cover all scope of a lane of the road section 402 of the first road in which the vehicle runs to the right. The quantity of vehicles on the lane in each direction may be one, two or more, which will not be particularly defined herein.

In the case that the first road has a small length, it may merely include one road section. The congestion condition of the first road may be detected through the camera at a side of the road section. Alternatively, the first road may also be divided into a plurality of road sections according to the practical need, and with respect to each road section, at least one camera may be provided at a side of the road section so as to cover most or all scope of the lane of the road section.

The first road, represented by R1, is divided into M road sections represented by r, i.e., R1=r1+ . . . +ri+ . . . rM or R1 (r1, . . . , ri, . . . , rM).

Figure 5:
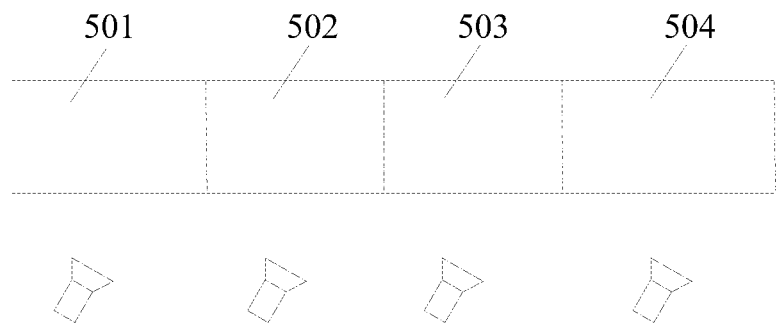
FIG. 5 is a schematic view showing a relationship between the camera and the road according to one embodiment of the present disclosure.
Figure 6:
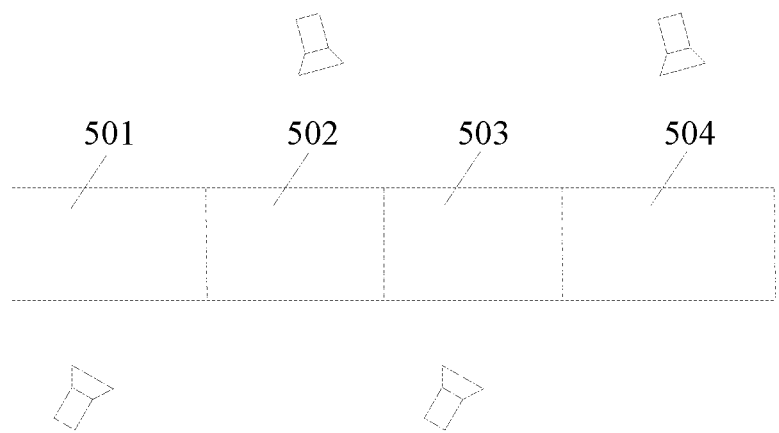
FIG. 6 is another schematic view showing a relationship between the camera and the road according to one embodiment of the present disclosure.

The camera may be provided at a side of the first road for each road section according to an actual situation of the first road. As shown in FIG. 5, the first road is a single-way road including one or more lanes, and it includes four road sections, i.e., road section 501, road section 502, road section 503 and road section 504. One camera may be provided for each road section, and the four cameras may be arranged at intervals at a same side of the first road. In addition, the four cameras may be arranged at different sides of the first road, as shown in FIG. 6.

Figure 7:
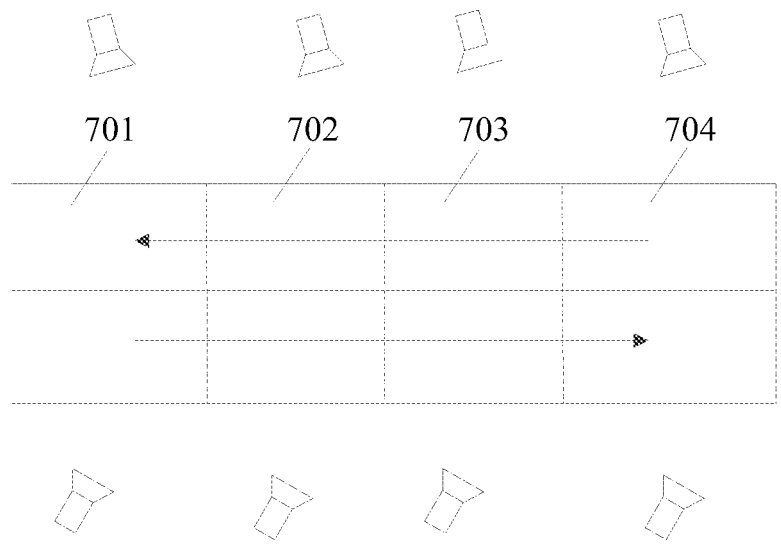
FIG. 7 is yet another schematic view showing a relationship between the camera and the road according to one embodiment of the present disclosure.

As shown in FIG. 7, the first road is a double-way road including four road sections, i.e., 701, 702, 703 and 704. A camera may be provided at a side of the first road for each road section, so as to detect the congestion condition of the lane of the first road in one direction. In addition, a camera may also be provided at the other side of the first road for each road section, so as to detect the congestion condition of the lane of the first road in another direction.

In addition, in a scenario, the first road includes a plurality of lanes. A vehicle may run straightly and then turn left along one lane, or may run straightly and then turn right along another lane. Although the vehicle runs in a same direction on the first road, i.e., although the first road is a single-way road, the first road may correspond to a plurality of directions. In this scenario, the cameras may be provided at both sides of the first road, so as to accurately detect the congestion conditions of the lanes of the first road in different directions.

When the first road is a single-way road, the camera may be oriented in such a manner as to face toward or away from a running direction of the vehicle, which will not be particularly defined herein. When the first road is a double-way road, usually the camera at each side is oriented in such a manner as to face toward the running direction of the vehicle.

The cameras may be represented by Camera (c1, . . . , ci, . . . , cL), and a mapping relationship between the first road and the cameras may be represented by R1→ {c1, . . . , ci, . . . , cL}, i.e., the first road may be covered by L cameras.

The L cameras arranged at the side of the first road may capture images about the vehicles on the first road in real time or regularly, and report the captured images. In a possible embodiment of the present disclosure, the L cameras may be started at a predetermined interval to capture and report the images.

In addition, at each time point, one camera may capture one image or a plurality of images, or may not capture any image, which will not be particularly defined herein. In other words, K may be greater than, equal to or smaller than L. In order to ensure the accuracy of the road congestion detection, usually each road section corresponds to at least one image, i.e., with respect to each road section, the camera may capture at least one image including an image content about the road section. At this time, K is greater than or equal to M.

In a possible embodiment of the present disclosure, the K images are captured by the L cameras corresponding to the first road at a same target time point, and K is equal to L. For example, at a time point T1, each of the L cameras may capture an image, so K images may be obtained and then reported. Correspondingly, the road congestion detection device may receive the K images captured by the L cameras at the same target time point. In this scenario, the target time point is just T1. In addition, the camera may report an identifier of each image to the road congestion detection device, and the identifier may represent the camera by which the image is captured.

The road congestion detection device may also obtain pre-stored K images which are captured by the L cameras corresponding to the first road at a same target time point, and the target time point may be a historical time point relative to a current time point.

It should be appreciated that, capturing ranges of different cameras corresponding to adjacent road sections of the first road may partially overlap each other, i.e., the images captured by the cameras corresponding to the adjacent road sections may include a part of image contents in a same scenario. Of course, the capturing ranges may not overlap each other either, which will not be particularly defined herein. Capturing ranges of different cameras corresponding to a same road section of the first road may partially, or may not, overlap each other, which will not be particularly defined herein.

Figure 8:
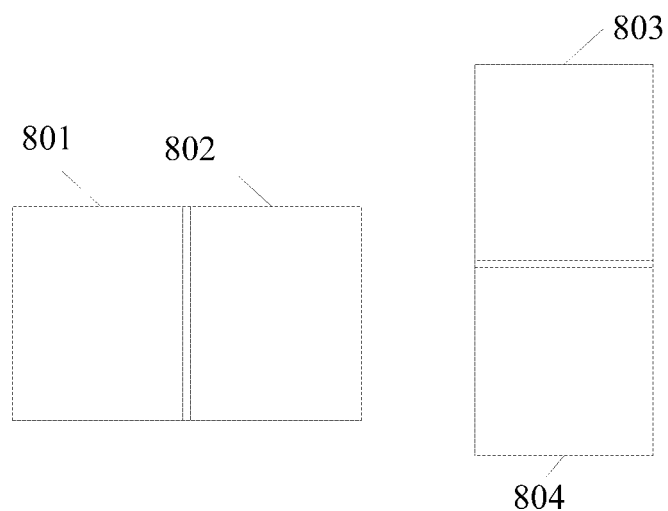
FIG. 8 is a schematic view showing a relationship among images taken by different cameras according to one embodiment of the present disclosure.

Generally, the capturing ranges of the cameras corresponding to the adjacent road sections may not overlap each other to an excessively great extent. As shown by a left view in FIG. 8, images 801 and 802 captured by the cameras corresponding to the adjacent road sections may merely share a small part of image contents. The capturing ranges of the cameras corresponding to a same road section of the first road may not overlap each other to an excessively great extent either. As shown by a right view in FIG. 8, images 803 and 804 captured by the cameras corresponding to the same road section may merely share a small part of image contents.

In the case that the capturing ranges of the cameras corresponding to the adjacent road sections of the first road do not overlap each other, a space between the capturing range shall not be too large, so as to prevent a congestion detection effect of the first road from being adversely affected. As shown by a left view in FIG. 9, images 901 and 902 captured by the cameras corresponding to the adjacent road sections are adjacent to each other in terms of their respective edges. In an actual scenario, it means that the capturing ranges of the two cameras do not overlap each other but are arranged adjacent to each other in terms of their respective edges. In the case that the capturing ranges of the cameras corresponding to the same road section of the first road do not overlap each other, a space between the capturing range shall not be too large either. As shown by a right view in FIG. 9, images 903 and 904 captured by the cameras corresponding to the same road section are adjacent to each other in terms of their respective edges.

S102: performing target detection on each image to obtain area ratio information, the area ratio information representing a ratio of an area of vehicles on a lane of a target road section to an area of the lane of the target road section, the target road section being a road section corresponding to the image in the M road sections.

In this step, the performing the target detection includes detecting vehicles in the image so as to determine pixels about the vehicles in the image. An existing or new target detection algorithm may be used to perform the target detection, and thus will not be particularly defined herein.

The area ratio information represents the ratio of the area of the vehicles on the lane of the target road section to the area of the lane of the target road section. The area of the vehicles on the lane refers to an area of the lane of the road section covered by the vehicles. In other words, the ratio is the area of the lane of the road section covered by the vehicles/the area of the lane of the road section.

The target road section may be a road section corresponding to the image on which the target detection is performed. The image may be identified so as to determine a road section corresponding to the image content in the image. In addition, the camera may be determined in accordance with the identifier of the image, and then the road section corresponding to the image may be determined in accordance with the mapping relationship between the cameras and the road sections of the first road.

The area ratio information may be determined in various ways. For example, the target detection may be performed on the image to obtain pixels about the vehicles in the images, and then the quantity of the pixels about the vehicles in the image is divided by the total quantity of pixels of the image to obtain a value as the area ratio information corresponding to the target road section.

For another example, the target detection may be performed on the image to determine a contour of each vehicle in the image as a vehicle detection box, the vehicle detection boxes about all the vehicles may be combined into a polygon, and then an area of the polygon may be divided by an area of the image to obtain a value as the area ratio information corresponding to the target road section. Alternatively, a sum of areas of the vehicle detection boxes about all the vehicles may be obtained, and then the sum may be divided by the area of the image to obtain a value as the area ratio information corresponding to the target road section. In this way, in the case that a vehicle is shielded by the other object during the capturing, the area ratio information may be determined in accordance with the vehicle detection box about the vehicle in the image, so it is able to improve the accuracy of the area ratio information.

For yet another example, the target detection may be performed on the image to determine the contour of each vehicle in the image as the vehicle detection box, a sum of the areas of the vehicle detection boxes about all the vehicles may be obtained, an area of the lane covered by the vehicles in an actual scenario may be determined in accordance with a correspondence between an image scenario and the actual scenario, and then the area of the lane covered by the vehicles may be divided by a total area of the lane of the target road section to obtain a value as the area ratio information corresponding to the target road section. In this way, when the lane of the target road section is not fully covered by the camera or a lane of the other road section is also covered by the camera, the area of the lane of the target road section covered by the vehicles in the actual scenario may be determined through mapping in accordance with the area of the vehicle detection boxes in the image, so it is able to improve the accuracy of the area ratio information.

In addition, each road section corresponds to at least one camera, so when each road section corresponds to at least one image, it may correspond to at least one piece of area ratio information. Finally, K pieces of area ratio information corresponding to the M road sections may be obtained, where K is greater than or equal to M. In the case that each road section corresponds to a plurality of cameras, e.g., two cameras, each camera may cover a lane of the road section in one direction. In this scenario, the area ratio information represents a ratio of an area of the lane of the road section covered by the vehicles in the one direction to an area of the lane of the road section in the one direction.

S103: determining a first congestion detection result of the first road at the target time point in accordance with the K pieces of area ratio information corresponding to the M road sections.

In this step, the first congestion detection result represents whether the first road is in the congested state at the target time point, or a congestion degree of the first road at the target time point. Alternatively, in the case that the first road is not in the congested state, the first congestion detection result also represents a road clearness degree of the first road at the target time point.

The first congestion detection result of the first road at the target time point may be determined in accordance with the K pieces of area ratio information in various ways. For example, in the case that the K pieces of area ratio information at least include a predetermined quantity of pieces of first area ratio information, the first road may be in the congested state at the target time point. Correspondingly, the more the pieces of first area ratio information, the more congested the first road. The predetermined quantity may be set according to the practical need. It may be a fixed value or it may vary along with a value of K, which will not be particularly defined herein. The first area ratio information may be area ratio information where the ratio is greater than a first predetermined threshold, and it represents that the lane of the road section corresponding to the first area ratio information is in the congested state.

For another example, in the case that the K pieces of area ratio information meet a predetermined condition, the first road may be in the congested state at the target time point. The predetermined condition includes that there are N pieces of target area ratio information in the K pieces of area ratio information, the N pieces of target area ratio information being area ratio information corresponding to N consecutive road sections in the first road, the target area ratio information is area ratio information where the ratio is greater than the first predetermined threshold. In other words, when consecutive N road sections of the first road are in the congested state, the first road may be in the congested state at the target time point. The larger the value of N, the more congested the first road at the target time point. N may be a fixed value or vary along with a value of M, e.g., a ratio of N to M may be greater than or equal to a second predetermined threshold.

The first predetermined threshold and the second predetermined threshold may be set according to the practical need, and thus will not be particularly defined herein.

For yet another example, the total area of the whole lane of the first road covered by the vehicles may be determined in accordance with the K pieces of area ratio information, and in the case that the total area is greater than a threshold, the first road may be in the congested state at the target time point.

In the embodiments of the present disclosure, the camera is provided for each road section of the first road to capture the image about a vehicle running scenario on each road section at a certain time point. Next, the target detection is performed on the image, so as to determine the area ratio information about the vehicles on the road section. Then, the congestion detection result of the first road at the time point may be determined in accordance with the area ratio information corresponding to the road section of the first road. As a result, the first road is divided into road sections, so as to improve the accuracy of the road congestion detection.

In a possible embodiment of the present disclosure, the first congestion detection result represents whether the first road is in the congested state. S103 specifically includes, in the case that the K pieces of area ratio information meet a predetermined condition, determining that the first road is in the congested state at the target time point. The predetermined condition includes that there are N pieces of target area ratio information in the K pieces of area ratio information, the N pieces of target area ratio information being area ratio information corresponding to N consecutive road sections in the first road, the target area ratio information is area ratio information where the ratio is greater than the first predetermined threshold, where N is a positive integer smaller than or equal to M, and a ratio of N to M is greater than or equal to the second predetermined threshold.

As defined above, the first congestion detection result is determined in accordance with the K pieces of area ratio information. To be specific, the first congestion detection result may be determined in accordance with whether the K pieces of area ratio information include N pieces of target area ratio information, i.e., whether the K pieces of area ratio information include N pieces of area ratio information where the ratio is greater than the first predetermined threshold. The N pieces of area ratio information include area ratio information corresponding to N consecutive road sections of the first road.

The ratio of N to M is greater than or equal to the second predetermined threshold. For example, when M is 4 and the second predetermined threshold is 0.5, it means that N is greater than or equal to 2. At this time, in the case that the K pieces of area ratio information at least include two pieces of target area ratio information, the first road may be in the congested state at the target time point. The larger the value of N, the more congested the first road.

For example, the first road includes four road sections, one camera is provided for each road section, and four pieces of area ratio information are determined in accordance with four images captured by the four cameras. The first predetermined threshold may be 90%, and the second predetermined threshold may be 0.5. When the four pieces of area ratio information include at least two pieces of target area ratio information where the ratio is greater than 90%, and the road sections corresponding to the at least two pieces of target area ratio information are distributed consecutively, the first road may be in the congested state at the target time point. The "distributed consecutively" refers to that every two adjacent road sections are distributed consecutively. As shown in FIG. 5, the road sections 501, 502, 503 and 504 are distributed consecutively, but the road sections 501 and 503 are not distributed consecutively.

In the embodiments of the present disclosure, whether the K pieces of area ratio information include N pieces of target area ratio information, i.e., whether the K pieces of area ratio information include N pieces of area ratio information where the ratio is greater than the first predetermined threshold, may be determined, and the N pieces of area ratio information include area ratio information corresponding to N consecutive road sections of the first road. When the K pieces of area ratio information include N pieces of target area ratio information, the first road may be in the congested state at the target time point. In this way, in the case that the consecutive road sections of the first road are in the congested state, the first road may be determined to be in the congested state at the target time point, so it is able to further improve the accuracy of the road congestion detection.

In a possible embodiment of the present disclosure, in the case that the first road has at least two directions, the N pieces of target area ratio information is area ratio information corresponding to N consecutive road sections in the first road in a same direction.

In the embodiments of the present disclosure, in the case that the first road has at least two directions, in order to accurately perform the road congestion detection, the N pieces of target area ratio information may be defined as area ratio information corresponding to the consecutive N road sections of the first road in a same direction. In other words, when the consecutive N road sections are in the congested state in a same direction, the first road may be in the congested state at the target time point.

For example, as shown in FIG. 7, the first road includes four road sections and has two directions, i.e., a first direction and a second direction opposite to each other. In a scenario, the road sections 701 and 703 are in the congested state in the first direction and the road sections 702 and 704 are in the congested state in the second direction. Although the consecutive road sections 701, 702, 703 and 704 are in the congested state, there are no consecutive roads in the congested state in a same direction. In this scenario, the first road is clear in each direction, so the first road is not in the congested state.

In another scenario, the road sections 701, 702 and 703 are in the congested state in the first direction and the road sections 702 and 704 are in the congested state in the second direction. When the consecutive N road sections are in the congested state in the first direction, the first road may not be clear in the first direction, and the vehicles running in the second direction may also be adversely affected, so the first road is in the congested state at the target time point.

For another example, the first road includes four road sections, and it is a single-way road. However, the first road has two directions, i.e., a first direction in which the vehicle runs straightly and then turns left and a second direction in which the vehicle runs straightly and then turns right. In this scenario, the congestion detection is performed on the first road with respect to each direction. When the consecutive N road sections are in the congested state in the first direction, the first road may not be clear in the first direction, so the first road may be in the congested stated at the target time point. When the consecutive N road sections are in the congested state in the second direction, the first road may not be clear in the second direction, so the first road may be in the congested state at the target time point.

In this scenario, usually the vehicle running in the first direction needs to wait for a traffic lamp and the vehicle running in the second direction may pass directly, so the congestion detection may be performed on the first road in each direction. In this way, when the first road is not in the congested state in the second direction and the vehicle is planned to run along a route including the first road in the second direction, this route may also be recommended.

In the embodiments of the present disclosure, in the case that the first road has at least two directions, the N pieces of target area ratio information include area ratio information corresponding to the consecutive N road sections of the first road in a same direction. When the consecutive N road sections are in the congested state in the same direction, the first road may be in the congested state at the target time point. In this way, it is able to further improve the accuracy of the road congestion detection.

In a possible embodiment of the present disclosure, the road congestion detection method further includes: obtaining a congestion detection result of the first road at a predetermined time interval; and in the case that an input for adjusting target information in accordance with at least two congestion detection results of the first road has been received, adjusting the target information in accordance with an input parameter of the input. The target information includes at least one of the predetermined time interval, the first predetermined threshold or the second predetermined threshold.

The congestion detection is performed on the first road in real time, regularly or irregularly, so as to obtain the congestion detection result of the first road. In actual use, the congestion detection is performed on the first road at the predetermined time interval, so as to obtain the congestion detection result of the first road at each detection time point.

For example, the congestion detection is performed on the first road at time points T1, T2, . . . , TN, with an time interval of t, so as to obtain N congestion detection results of the first road. The congestion detection result of the first road is obtained at the predetermined time interval in a similar way as the first congestion detection result of the first road at the target time point mentioned hereinabove, which will thus not be particularly defined herein.

The target information may be adjusted in accordance with the at least two congestion detection results of the first road. The target information is information which influences the congestion detection result during the congestion detection. For example, during the congestion detection, the larger the first predetermined threshold, the more accurate the congestion detection result of the first road in congested state; the larger the second predetermined threshold, the more accurate the congestion detection result of the first road in the congested state; and the smaller the predetermined time interval, the more accurate the congestion detection result when the congestion detection result is applied to such scenarios as navigation route planning, parking space recommendation, and vehicle guiding and diversion. Hence, in a possible embodiment of the present disclosure, the target information includes at least one of the predetermined time interval, the first predetermined threshold or the second predetermined threshold.

A user may determine whether the at least two congestion detection results of the first road are accurate and/or whether the congestion detection result of the first road obtained at the predetermined time interval meets the requirement in accordance with an actual congestion condition of the first road and an application-related condition.

When the at least two congestion detection results of the first road are not sufficiently accurate and/or the congestion detection result of the first road obtained at the predetermined time interval does not meet the requirement, the user may adjust the target information.

Correspondingly, upon the receipt of the input for adjusting the target information, the road congestion detection device may adjust the target information in accordance with the input parameter of the input. The input parameter of the input includes at least one of increasing the first predetermined threshold, increasing the second predetermined threshold, decreasing the predetermined time interval; or adjusting the first predetermined value to a certain value, adjusting the second predetermined threshold to a certain value, or decreasing the predetermined time interval to a certain value.

When the at least two congestion detection results of the first road are sufficiently accurate and the congestion detection result of the first road obtained at the predetermined time interval meets the application, the user may also adjust the target information.

Correspondingly, upon the receipt of the input for adjusting the target information, the road congestion detection device may adjust the target information in accordance with the input parameter of the input. The input parameter of the input includes at least one of decreasing the first predetermined threshold, decreasing the second predetermined threshold, increasing the predetermined time interval; or adjusting the first predetermined value to a certain value, adjusting the second predetermined threshold to a certain value, or increasing the predetermined time interval to a certain value.

In the embodiments of the present disclosure, the congestion detection results of the first road are obtained at the predetermined time interval, and upon the receipt of the input for adjusting the target information in accordance with the at least two congestion detection results of the first road, the target information is adjusted in accordance with the input parameter of the input. The target information includes at least one of the predetermined time interval, the first predetermined threshold or the second predetermined threshold. In this way, the user may adjust the parameters in accordance with the actual congestion condition of the first road and the application-related condition during the congestion detection on the first road, so as to balance the accuracy and the flexibility of the congestion detection.

In a possible embodiment of the present disclosure, S102 specifically includes: performing the target detection on the image to obtain vehicle detection information, the vehicle detection information including a vehicle detection box for each vehicle image content in the case that the image includes the vehicle image content; determining an area of each vehicle on the lane of the target road section, the area being an area of the lane covered by the vehicle detection box in the image; and determining a ratio of the area of the lane covered by the vehicle detection boxes in the image to the area of the lane of the target road, so as to obtain the area ratio information.

In the embodiments of the present disclosure, the target detection may be performed on the image so as to determine a pixel contour of each vehicle in the image in the case that the image includes the vehicle image content, thereby to obtain the vehicle detection boxes in the image.

The vehicle detection boxes for all the vehicles may be combined into a polygon, and an area of the polygon may be determined as the area of the lane of the target road section covered by the vehicles. Alternatively, a sum of areas of the vehicle detection boxes for all the vehicles may be obtained and determined as the area of the lane of the target road section covered by the vehicles.

Next, the area of the lane of the target road section covered by the vehicles may be divided by an area of the images, so as to obtain a value as the area ratio information corresponding to the target road section.

In this way, in the case that the vehicle is shielded by the other object, the area ratio information is determined through detecting the vehicle detection box in the image, so it is able to improve the accuracy of the area ratio information.

In a possible embodiment of the present disclosure, the first road is a road in a target space object, and the target space object further includes a second road. The road congestion detection method further includes: obtaining a second congestion detection result of the second road at the target time point; and controlling the vehicles in the target space object in accordance with the first congestion detection result and the second congestion detection result.

In the embodiments of the present disclosure, the target space object includes, but not limited to, a parking lot, a garden, a community or a business area. The target space object may include at least one road.

When the target space object is the parking lot, the parking lot may be planned in advance in accordance with its specific situation, so as to obtain a plurality of roads. The parking lot may include a first road and a second road, and the cameras may be provided at the side or sides of each road, so as to obtain a mapping relationship between the cameras and the roads.

Figures 9, 10:
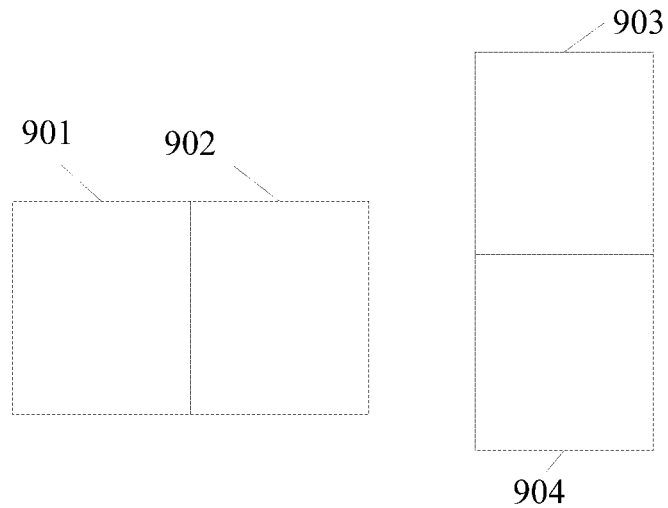
FIG. 9 is another schematic view showing the relationship among the images taken by different cameras according to one embodiment of the present disclosure.
FIG. 10 is a schematic view showing a mapping relationship between a lane in a parking lot and the camera according to one embodiment of the present disclosure.

As shown in FIG. 10, the roads in the parking lot form a road network, and each long route in the road network may be taken as an entire road. One side of each grid represents a part of, i.e., a road section of, a corresponding road in the parking lot, and a camera represented by ci is provided for each side. The camera may cover a lane of the road section. The quantity of cameras for covering each road may be set in accordance with a length of the road.

At the target time point, the congestion detection results of each road in the parking lot, i.e., the first congestion detection result of the first road and the second congestion detection result of the second road, may be obtained. As shown in FIG. 10, with respect to the road provided with the cameras c1, c2, c3 and c4, a ratio of an area of the road section corresponding to each of c1, c2, c3 and c4 and covered by vehicles to a total area of the road section is more than 90%, which is greater than the first predetermined threshold. In addition, the four road sections are in the congested state in a same direction. Hence, the corresponding road may be in the congested state.

Next, the vehicles in the parking lot may be controlled in accordance with the congestion detection result of each road. A controlling mode may include, but not limited to, navigation route planning, parking space recommendation, and vehicle guiding and diversion.

For example, during the navigation route planning, a congested road may be avoided as possible and a clear road may be selected in accordance with the congestion detection result of each road in the parking lot. During the vehicle guiding and diversion, it is able to prompt the user to avoid the congested road as possible. In this way, it is able to control the vehicles in the parking lot.

In the embodiments of the present disclosure, the second congestion detection result of the second road at the target time point may be obtained, and then the vehicles in the target space object may be controlled in accordance with the first congestion detection result and the second congestion detection result. In this way, it is able to improve the facility utilization in the target space object, e.g., the parking lot, and improve a turnover rate of the parking lot.

Second Embodiment

Figure 11:
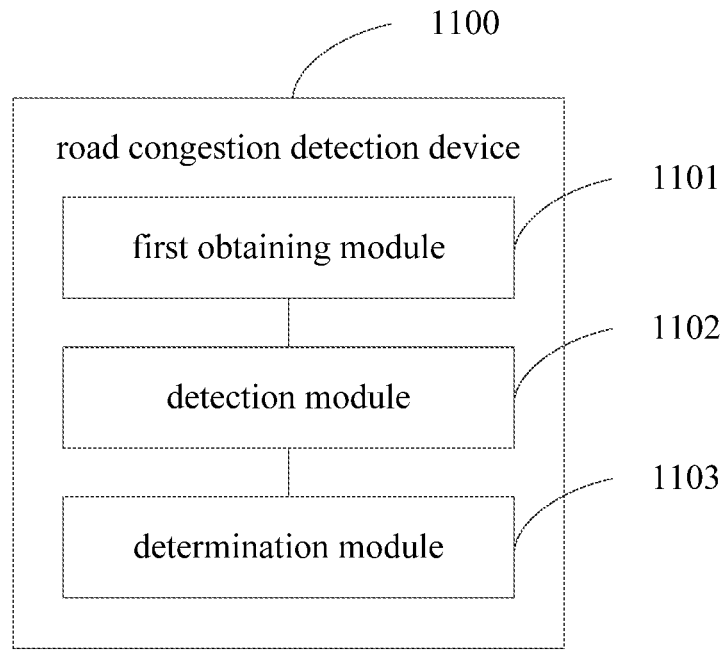
FIG. 11 is a schematic view showing a road congestion detection device according to a second embodiment of the present disclosure.

As shown in FIG. 11, the present disclosure provides in this embodiment a road congestion detection device 1100, which includes: a first obtaining module 1101 configured to obtain K images taken by L cameras corresponding to a first road at a same target time point, the first road including M road sections, each road section corresponding to at least one camera, M, L and K each being a positive integer, and L being greater than or equal to M; a detection module 1102 configured to perform target detection on each image to obtain area ratio information, the area ratio information representing a ratio of an area of vehicles on a lane of a target road section to an area of the lane of the target road section, the target road section being a road section corresponding to the image in the M road sections; and a determination module 1103 configured to determine a first congestion detection result of the first road at the target time point in accordance with K pieces of area ratio information corresponding to the M road sections.

In a possible embodiment of the present disclosure, the first congestion detection result represents whether the first road is in a congested state. The determination module 1103 is further configured to, in the case that the K pieces of area ratio information meet a predetermined condition, determine that the first road is in the congested state at the target time point. The predetermined condition includes that there are N pieces of target area ratio information in the K pieces of area ratio information, the N pieces of target area ratio information being area ratio information corresponding to N consecutive road sections in the first road, the target area ratio information is area ratio information where the ratio is greater than a first predetermined threshold, where N is a positive integer smaller than or equal to M, and a ratio of N to M is greater than or equal to a second predetermined threshold.

In a possible embodiment of the present disclosure, in the case that the first road has at least two directions, the N pieces of target area ratio information is area ratio information corresponding to N consecutive road sections in the first road in a same direction.

In a possible embodiment of the present disclosure, road congestion detection device further includes: a second obtaining module configured to obtain a congestion detection result of the first road at a predetermined time interval; and an adjustment module configured to, in the case that an input for adjusting target information in accordance with at least two congestion detection results of the first road has been received, adjust the target information in accordance with an input parameter of the input. The target information includes at least one of the predetermined time interval, the first predetermined threshold or the second predetermined threshold.

In a possible embodiment of the present disclosure, the detection module 1102 is further configured to: perform the target detection on the image to obtain vehicle detection information, the vehicle detection information including a vehicle detection box for each vehicle image content in the case that the image includes the vehicle image content; determine an area of each vehicle on the lane of the target road section, the area being an area of the lane covered by the vehicle detection box in the image; and determine a ratio of the area of the lane covered by the vehicle detection boxes in the image to the area of the lane of the target road, so as to obtain the area ratio information.

In a possible embodiment of the present disclosure, the first road is a road in a target space object, and the target space object further includes a second road. The road congestion detection device further includes: a third obtaining module configured to obtain a second congestion detection result of the second road at the target time point; and a control module configured to control the vehicles in the target space object in accordance with the first congestion detection result and the second congestion detection result.

The road congestion detection device 1100 in the embodiments of the present disclosure may implement the steps in the above-mentioned road congestion detection method with a same beneficial effect, which will not be particularly defined herein.

The collection, storage, usage, processing, transmission, supply and publication of personal information involved in the embodiments of the present disclosure comply with relevant laws and regulations, and do not violate the principle of the public order.

The present disclosure further provides in some embodiments an electronic device, a computer-readable storage medium and a computer program product.

Figure 12:
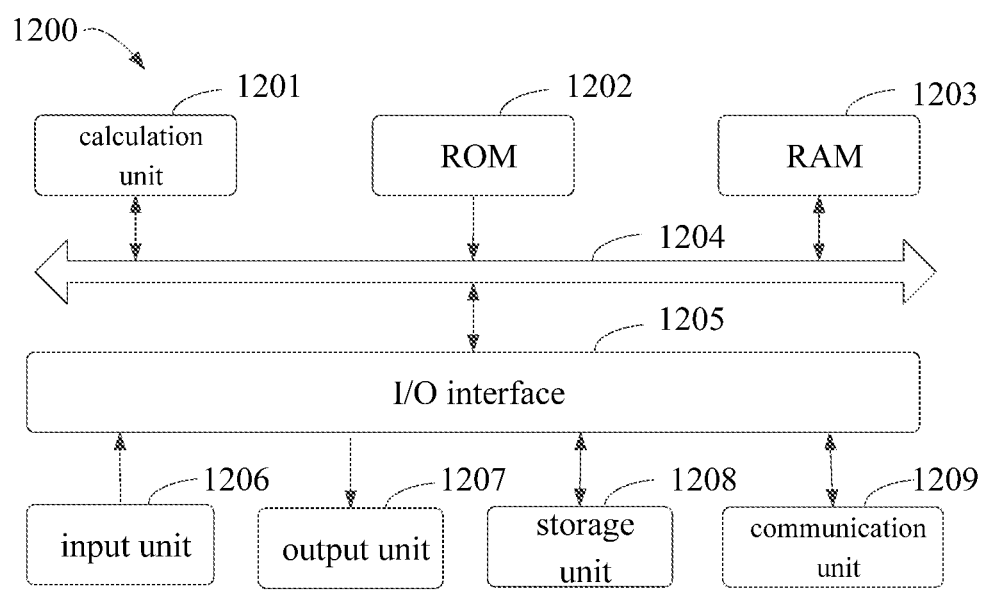
FIG. 12 is a block diagram of an electronic device according one embodiment of the present disclosure.

FIG. 12 is a schematic block diagram of an exemplary electronic device 1200 in which embodiments of the present disclosure may be implemented. The electronic device is intended to represent all kinds of digital computers, such as a laptop computer, a desktop computer, a work station, a personal digital assistant, a server, a blade server, a main frame or other suitable computers. The electronic device may also represent all kinds of mobile devices, such as a personal digital assistant, a cell phone, a smart phone, a wearable device and other similar computing devices. The components shown here, their connections and relationships, and their functions, are meant to be exemplary only, and are not meant to limit implementations of the present disclosure described and/or claimed herein.

As shown in FIG. 12, the electronic device 1200 includes a computing unit 1201 configured to execute various processings in accordance with computer programs stored in a Read Only Memory (ROM) 1202 or computer programs loaded into a Random Access Memory (RAM) 1203 via a storage unit 1208. Various programs and data desired for the operation of the electronic device 1200 may also be stored in the RAM 1203. The computing unit 1201, the ROM 1202 and the RAM 1203 may be connected to each other via a bus 1204. In addition, an input/output (I/O) interface 1205 may also be connected to the bus 1204.

Multiple components in the electronic device 1200 are connected to the I/O interface 1205. The multiple components include: an input unit 1206, e.g., a keyboard, a mouse and the like; an output unit 1207, e.g., a variety of displays, loudspeakers, and the like; a storage unit 1208, e.g., a magnetic disk, an optic disk and the like; and a communication unit 1209, e.g., a network card, a modem, a wireless transceiver, and the like. The communication unit 1209 allows the electronic device 1200 to exchange information/data with other devices through a computer network and/or other telecommunication networks, such as the Internet.

The computing unit 1201 may be any general purpose and/or special purpose processing components having a processing and computing capability. Some examples of the computing unit 1201 include, but are not limited to: a central processing unit (CPU), a graphic processing unit (GPU), various special purpose artificial intelligence (AI) computing chips, various computing units running a machine learning model algorithm, a digital signal processor (DSP), and any suitable processor, controller, microcontroller, etc. The computing unit 1201 carries out the aforementioned methods and processes, e.g., the road congestion detection method. For example, in some embodiments of the present disclosure, the road congestion detection method may be implemented as a computer software program tangibly embodied in a machine readable medium such as the storage unit 1208. In some embodiments of the present disclosure, all or a part of the computer program may be loaded and/or installed on the electronic device 1200 through the ROM 1202 and/or the communication unit 1209. When the computer program is loaded into the RAM 1203 and executed by the computing unit 1201, one or more steps of the foregoing text recognition method may be implemented. Optionally, in some other embodiments of the present disclosure, the computing unit 1201 may be configured in any other suitable manner (e.g., by means of firmware) to implement the road congestion detection method.

Various implementations of the aforementioned systems and techniques may be implemented in a digital electronic circuit system, an integrated circuit system, a field-programmable gate array (FPGA), an application specific integrated circuit (ASIC), an application specific standard product (ASSP), a system on a chip (SOC), a complex programmable logic device (CPLD), computer hardware, firmware, software, and/or a combination thereof. The various implementations may include an implementation in form of one or more computer programs. The one or more computer programs may be executed and/or interpreted on a programmable system including at least one programmable processor. The programmable processor may be a special purpose or general purpose programmable processor, may receive data and instructions from a storage system, at least one input device and at least one output device, and may transmit data and instructions to the storage system, the at least one input device and the at least one output device.

Program codes for implementing the methods of the present disclosure may be written in one programming language or any combination of multiple programming languages. These program codes may be provided to a processor or controller of a general purpose computer, a special purpose computer, or other programmable data processing device, such that the functions/operations specified in the flow diagram and/or block diagram are implemented when the program codes are executed by the processor or controller. The program codes may be run entirely on a machine, run partially on the machine, run partially on the machine and partially on a remote machine as a standalone software package, or run entirely on the remote machine or server.

In the context of the present disclosure, the machine readable medium may be a tangible medium, and may include or store a program used by an instruction execution system, device or apparatus, or a program used in conjunction with the instruction execution system, device or apparatus. The machine readable medium may be a machine readable signal medium or a machine readable storage medium. The machine readable medium includes, but is not limited to: an electronic, magnetic, optical, electromagnetic, infrared, or semiconductor system, device or apparatus, or any suitable combination thereof. A more specific example of the machine readable storage medium includes: an electrical connection based on one or more wires, a portable computer disk, a hard disk, a random access memory (RAM), a read only memory (ROM), an erasable programmable read only memory (EPROM or flash memory), an optic fiber, a portable compact disc read only memory (CD-ROM), an optical storage device, a magnetic storage device, or any suitable combination thereof.

To facilitate user interaction, the system and technique described herein may be implemented on a computer. The computer is provided with a display device (for example, a cathode ray tube (CRT) or liquid crystal display (LCD) monitor) for displaying information to a user, a keyboard and a pointing device (for example, a mouse or a track ball). The user may provide an input to the computer through the keyboard and the pointing device. Other kinds of devices may be provided for user interaction, for example, a feedback provided to the user may be any manner of sensory feedback (e.g., visual feedback, auditory feedback, or tactile feedback); and input from the user may be received by any means (including sound input, voice input, or tactile input).

The system and technique described herein may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the system and technique), or any combination of such back-end, middleware, or front-end components. The components of the system can be interconnected by any form or medium of digital data communication (e.g., a communication network). Examples of communication networks include a local area network (LAN), a wide area network (WAN) and the Internet.

The computer system can include a client and a server. The client and server are generally remote from each other and typically interact through a communication network. The relationship of client and server arises by virtue of computer programs running on respective computers and having a client-server relationship to each other. The server may be a cloud server, a server of a distributed system, or a server combined with blockchain.

It should be appreciated that, all forms of processes shown above may be used, and steps thereof may be reordered, added or deleted. For example, as long as expected results of the technical solutions of the present disclosure can be achieved, steps set forth in the present disclosure may be performed in parallel, performed sequentially, or performed in a different order, and there is no limitation in this regard.

The foregoing specific implementations constitute no limitation on the scope of the present disclosure. It is appreciated by those skilled in the art, various modifications, combinations, sub-combinations and replacements may be made according to design requirements and other factors. Any modifications, equivalent replacements and improvements made without deviating from the spirit and principle of the present disclosure shall be deemed as falling within the scope of the present disclosure.

What is claimed is:

1. A road congestion detection method realized by a computer, comprising:
obtaining K images taken by L cameras corresponding to a first road at a same target time point, the first road comprising M road sections, each road section corresponding to at least one camera, M, L and K each being a positive integer, and L being greater than or equal to M;
performing target detection on each image to obtain area ratio information, the area ratio information representing a ratio of an area of vehicles on a lane of a target road section to an area of the lane of the target road section, the target road section being a road section corresponding to the image in the M road sections; and
determining a first congestion detection result of the first road at the target time point in accordance with K pieces of area ratio information corresponding to the M road sections;
wherein the first congestion detection result represents whether the first road is in a congested state, and the determining the first congestion detection result of the first road at the target time point in accordance with the K pieces of area ratio information corresponding to the M road sections comprises, in the case that the K pieces of area ratio information meet a predetermined condition, determining that the first road is in the congested state at the target time point,
wherein the predetermined condition comprises that there are N pieces of target area ratio information in the K pieces of area ratio information, the N pieces of target area ratio information being area ratio information corresponding to N consecutive road sections in the first road, the target area ratio information is area ratio information where the ratio is greater than a first predetermined threshold, where N is a positive integer smaller than or equal to M, and a ratio of N to M is greater than or equal to a second predetermined threshold.

2. The road congestion detection method according to claim 1, wherein in the case that the first road has at least two directions, the N pieces of target area ratio information is area ratio information corresponding to N consecutive road sections in the first road in a same direction.

3. The road congestion detection method according to claim 1, further comprising:
obtaining a congestion detection result of the first road at a predetermined time interval; and
in the case that an input for adjusting target information in accordance with at least two congestion detection results of the first road has been received, adjusting the target information in accordance with an input parameter of the input,
wherein the target information comprises at least one of the predetermined time interval, the first predetermined threshold or the second predetermined threshold.

4. The road congestion detection method according to claim 1, wherein
the performing the target detection on the image to obtain the area ratio information comprises:
performing the target detection on the image to obtain vehicle detection information, the vehicle detection information comprising a vehicle detection box for each vehicle image content in the case that the image comprises the vehicle image content;
determining an area of each vehicle on the lane of the target road section, the area being an area of the lane covered by the vehicle detection box in the image; and
determining a ratio of the area of the lane covered by the vehicle detection boxes in the image to the area of the lane of the target road, so as to obtain the area ratio information.

5. The road congestion detection method according to claim 1, wherein the first road is a road in a target space object, and the target space object further comprises a second road, wherein the road congestion detection method further comprises:
obtaining a second congestion detection result of the second road at the target time point; and controlling the vehicles in the target space object in accordance with the first congestion detection result and the second congestion detection result.

6. The road congestion detection method according to claim 5, wherein the controlling the vehicles comprises at least one of navigation route planning, parking space recommendation, or vehicle guiding and diversion.

7. An electronic device realized by a computer, comprising at least one processor and a memory in communication with the at least one processor, wherein the memory is configured to store therein an instruction executed by the at least one processor, and the at least one processor is configured to enable the electronic device to execute the instruction so as to implement a road congestion detection method, comprising:

obtaining K images taken by L cameras corresponding to a first road at a same target time point, the first road comprising M road sections, each road section corresponding to at least one camera, M, L and K each being a positive integer, and L being greater than or equal to M;

performing target detection on each image to obtain area ratio information, the area ratio information representing a ratio of an area of vehicles on a lane of a target road section to an area of the lane of the target road section, the target road section being a road section corresponding to the image in the M road sections; and determining a first congestion detection result of the first road at the target time point in accordance with K pieces of area ratio information corresponding to the M road sections, wherein the first congestion detection result represents whether the first road is in a congested state, and the determining the first congestion detection result of the first road at the target time point in accordance with the K pieces of area ratio information corresponding to the M road sections comprises, in the case that the K pieces of area ratio information meet a predetermined condition, determining that the first road is in the congested state at the target time point, wherein the predetermined condition comprises that there are N pieces of target area ratio information in the K pieces of area ratio information, the N pieces of target area ratio information being area ratio information corresponding to N consecutive road sections in the first road, the target area ratio information is area ratio information where the ratio is greater than a first predetermined threshold, where N is a positive integer smaller than or equal to M, and a ratio of N to M is greater than or equal to a second predetermined threshold.

8. The electronic device according to claim 7, wherein in the case that the first road has at least two directions, the N pieces of target area ratio information is area ratio information corresponding to N consecutive road sections in the first road in a same direction.

9. The electronic device according to claim 7, wherein the road congestion detection method further comprises:

obtaining a congestion detection result of the first road at a predetermined time interval; and in the case that an input for adjusting target information in accordance with at least two congestion detection results of the first road has been received, adjusting the target information in accordance with an input parameter of the input, wherein the target information comprises at least one of the predetermined time interval, the first predetermined threshold or the second predetermined threshold.

10. The electronic device according to claim 7, wherein the performing the target detection on the image to obtain the area ratio information comprises:

performing the target detection on the image to obtain vehicle detection information, the vehicle detection information comprising a vehicle detection box for each vehicle image content in the case that the image comprises the vehicle image content;

determining an area of each vehicle on the lane of the target road section, the area being an area of the lane covered by the vehicle detection box in the image; and determining a ratio of the area of the lane covered by the vehicle detection boxes in the image to the area of the lane of the target road, so as to obtain the area ratio information.

11. The electronic device according to claim 7, wherein the first road is a road in a target space object, and the target space object further comprises a second road, wherein the road congestion detection method further comprises:

obtaining a second congestion detection result of the second road at the target time point; and controlling the vehicles in the target space object in accordance with the first congestion detection result and the second congestion detection result.

12. The electronic device according to claim 11, wherein the controlling the vehicles comprises at least one of navigation route planning, parking space recommendation, or vehicle guiding and diversion.

13. A non-transitory computer-readable storage medium storing therein a computer instruction, wherein the computer instruction is executed by a computer so as to implement a road congestion detection method, comprising:

obtaining K images taken by L cameras corresponding to a first road at a same target time point, the first road comprising M road sections, each road section corresponding to at least one camera, M, L and K each being a positive integer, and L being greater than or equal to M;

performing target detection on each image to obtain area ratio information, the area ratio information representing a ratio of an area of vehicles on a lane of a target road section to an area of the lane of the target road section, the target road section being a road section corresponding to the image in the M road sections; and determining a first congestion detection result of the first road at the target time point in accordance with K pieces of area ratio information corresponding to the M road sections;

wherein the first congestion detection result represents whether the first road is in a congested state, and the determining the first congestion detection result of the first road at the target time point in accordance with the K pieces of area ratio information corresponding to the M road sections comprises, in the case that the K pieces of area ratio information meet a predetermined condition, determining that the first road is in the congested state at the target time point, wherein the predetermined condition comprises that there are N pieces of target area ratio information in the K pieces of area ratio information, the N pieces of target area ratio information being area ratio information corresponding to N consecutive road sections in the first road, the target area ratio information is area ratio information where the ratio is greater than a first predetermined threshold, where N is a positive integer smaller than or equal to M, and a ratio of N to M is greater than or equal to a second predetermined threshold.

14. The non-transitory computer-readable storage medium according to claim 13, wherein in the case that the first road has at least two directions, the N pieces of target area ratio information is area ratio information corresponding to N consecutive road sections in the first road in a same direction.

15. The non-transitory computer-readable storage medium according to claim 13, wherein the road congestion detection method further comprises:
    obtaining a congestion detection result of the first road at a predetermined time interval; and
    in the case that an input for adjusting target information in accordance with at least two congestion detection results of the first road has been received, adjusting the target information in accordance with an input parameter of the input,
    wherein the target information comprises at least one of the predetermined time interval, the first predetermined threshold or the second predetermined threshold.

16. The non-transitory computer-readable storage medium according to claim 13, wherein the performing the target detection on the image to obtain the area ratio information comprises:
    performing the target detection on the image to obtain vehicle detection information, the vehicle detection information comprising a vehicle detection box for each vehicle image content in the case that the image comprises the vehicle image content;
    determining an area of each vehicle on the lane of the target road section, the area being an area of the lane covered by the vehicle detection box in the image; and
    determining a ratio of the area of the lane covered by the vehicle detection boxes in the image to the area of the lane of the target road, so as to obtain the area ratio information.

17. The non-transitory computer-readable storage medium according to claim 13, wherein the first road is a road in a target space object, and the target space object further comprises a second road, wherein the road congestion detection method further comprises:
    obtaining a second congestion detection result of the second road at the target time point; and
    controlling the vehicles in the target space object in accordance with the first congestion detection result and the second congestion detection result,
    wherein the controlling the vehicles comprises at least one of navigation route planning, parking space recommendation, or vehicle guiding and diversion.

* * * * *